United States Patent
Chubanov et al.

(10) Patent No.: US 11,823,462 B2
(45) Date of Patent: Nov. 21, 2023

(54) DEVICE AND METHOD FOR TRAINING A POLYHEDRAL CLASSIFIER

(71) Applicant: Robert Bosch GmbH, Stuttgart (DE)

(72) Inventors: Sergei Chubanov, Stuttgart (DE); Daria Stepanova, Renningen (DE)

(73) Assignee: ROBERT BOSCH GMBH, St (DE)

( * ) Notice: Subject to any disclaimer, the term of this patent is extended or adjusted under 35 U.S.C. 154(b) by 290 days.

(21) Appl. No.: 16/934,422

(22) Filed: Jul. 21, 2020

(65) Prior Publication Data
US 2021/0073587 A1    Mar. 11, 2021

(30) Foreign Application Priority Data
Sep. 9, 2019 (EP) .................... 19196078

(51) Int. Cl.
*G06V 20/56* (2022.01)
*G06N 20/00* (2019.01)
(Continued)

(52) U.S. Cl.
CPC ............ *G06V 20/56* (2022.01); *G06F 18/214* (2023.01); *G06F 18/2148* (2023.01); *G06F 18/2451* (2023.01); *G06N 20/00* (2019.01); *G06V 10/764* (2022.01); *G06V 10/776* (2022.01); *G06V 10/7747* (2022.01); *G06V 30/19147* (2022.01); *G06V 30/19173* (2022.01)

(58) Field of Classification Search
None
See application file for complete search history.

(56) References Cited

U.S. PATENT DOCUMENTS

2006/0212413 A1*  9/2006  Rujan .................. G06F 16/355
                                               706/20
2018/0150766 A1*  5/2018  Choi .................... G06N 5/022
(Continued)

FOREIGN PATENT DOCUMENTS

WO    WO-2019104618 A1 *  6/2019  .......... G06K 9/6256

OTHER PUBLICATIONS

Tanveer, M., Rajani, T., Rastogi, R. et al. Comprehensive review on twin support vector machines. Ann Oper Res (Mar. 2022). https://doi.org/10.1007/s10479-022-04575-w (Year: 2022).*
(Continued)

*Primary Examiner* — Emily C Terrell
*Assistant Examiner* — Nathan J Bloom
(74) *Attorney, Agent, or Firm* — NORTON ROSE FULBRIGHT US LLP; Gerard Messina

(57) ABSTRACT

A method for training a polyhedral classifier is described including obtaining training data in a data space, the training data including first data points associated with a first label and second data points associated with a second label, determining a pair of hyperplanes by determining an orientation of the pair of hyperplanes based on a minimization of a distance between the pair of hyperplanes such that the first data points lie between the hyperplanes in relation to a distance between the pair of hyperplanes such that both the first data points and the second data points lie between the hyperplanes and determining the position of the pair of hyperplanes such that the first data points lie between the pair of hyperplanes and the second data points are at least partially separated from the first data points by the pair of hyperplanes.

14 Claims, 5 Drawing Sheets

(51) Int. Cl.
- *G06V 10/774* (2022.01)
- *G06V 30/19* (2022.01)
- *G06F 18/214* (2023.01)
- *G06V 10/764* (2022.01)
- *G06V 10/776* (2022.01)
- *G06F 18/2451* (2023.01)

(56) References Cited

U.S. PATENT DOCUMENTS

2019/0012526 A1* 1/2019 Guo .................. G06V 10/87
2021/0056466 A1* 2/2021 Ortyl, III .............. G06N 20/00

OTHER PUBLICATIONS

Lundberg L, Lennerstad H, Boeva V, García-Martín E. "Handling non-linear relations in support vector machines through hyperplane folding" Proc. of the 2019 11th Inter. Conf Machine Learning and Computing, Feb. 22, 2019 (pp. 137-141). (Year: 2019).*

Tadayon, Saied, and Bijan Tadayon. "Preprocessing Method for Support Vector Machines Based on Center of Mass." Advance Trends in Soft Computing. Springer, Cham, 2014. 451-465. (Year: 2014).*

Cevikalp, Hakan, and Bill Triggs. "Polyhedral conic classifiers for visual object detection and classification." Proceedings of the IEEE Conference on Computer Vision and Pattern Recognition. 2017. (Year: 2017).*

Leng, et al.: "An effective method to determine wether a point is within a convex hull and its generalized convex polyhedron classifier", Information Sciences, 504 (17) (2019), pp. 435-448, XP085759322.

Orsenigo and Vercellis: "Accurately learning from few examples with a polyhedral classifier", Comput. Optim. Appl. 38 (2007), pp. 235-247, XP019550061.

M. Anthony, "Generalization Error Bounds for Threshold Decision Lists," In Journal of Machine Learning Research, vol. 5, 2004, pp. 189-217.

Cevikalp, Hakan: "Best Fitting Hyperplanes for Classification," J. of IEEE Transactions on Pattern Analysis & Machine Intelligence, X(X), (2016), pp. 1-14.

* cited by examiner

DEVICE AND METHOD FOR TRAINING A POLYHEDRAL CLASSIFIER

CROSS REFERENCE

The present application claims the benefit under 35 U.S.C. § 119 of European Patent Application No. EP 19196078.0 filed on Sep. 9, 2019, which is expressly incorporated herein by reference in its entirety.

FIELD

The present invention relates to devices and methods for training a polyhedral classifier.

BACKGROUND INFORMATION

A polyhedral classifier allows classification of sensor data, i.e., of objects in an image taken for autonomous driving or of sensor information available in the form of a time series.

Compared to a neural network for classification, a polyhedral classifier may typically be trained in much shorter time and may therefore for example also be trained in devices with lower computational power such as embedded systems.

The paper by M. Anthony, "Generalization error bounds for threshold decision lists". In Journal of Machine Learning Research, 5:189-217, 2004, gives an overview of cutting-plane methods for learning (in other words training) polyhedral classifiers.

Training methods for polyhedral classifiers which achieve high accuracy of the trained classifier at low computational effort (both for training and classification by means of the trained classifier) are desirable.

Example methods and devices in accordance with the present invention provide an approach for fast and accurate binary classification.

According to an example embodiment of the present invention, a method for training a polyhedral classifier includes obtaining training data in a data space, the training data including a plurality of first data points associated with a first label and a plurality of second data points associated with a second label and determining a pair of hyperplanes by determining an orientation of the pair of hyperplanes based on a minimization of a distance between the pair of hyperplanes such that the plurality of first data points lie between the hyperplanes in relation to a distance between the pair of hyperplanes such that both the plurality of first data points and the plurality of second data points lie between the hyperplanes and determining the position of the pair of hyperplanes such that the plurality of first data points lie between the pair of hyperplanes and the plurality of second data points are at least partially separated from the plurality of first data points by the pair of hyperplanes. The method mentioned in this paragraph provides a first example.

The relation may be the ratio of the distance between the pair of hyperplanes such that the plurality of first data points lie between the hyperplanes and the distance between the pair of hyperplanes such that both the plurality of first data points and the plurality of second data points lie between the hyperplanes. The features mentioned in this paragraph in combination with the first example provide a second example. Determining the pair of hyperplanes may include determining the representation of a linear function mapping the data space to the real numbers and an interval whose endpoints give the position of the hyperplanes in the data space. The features mentioned in this paragraph in combination with any one of the first example to second example provide an third example.

The distance between the pair of the hyperplanes may be given by the length of the interval. The features mentioned in this paragraph in combination with the third example provide a fourth example.

Obtaining the training data in the data space may include mapping an original set of training data points in an original data space to the data space by means of a transformation mapping from the original data space to the data space. The features mentioned in this paragraph in combination with any one of the first example to fourth example provide a fifth example.

The original data space and the data space may be Euclidean spaces and the dimension of the data space may be higher than the dimension of the original data space. The features mentioned in this paragraph in combination with the fifth example provide a sixth example.

The dimension of the data space may be higher than the dimension of the original data space by one. The features mentioned in this paragraph in combination with the sixth example provide a seventh example.

The transformation mapping may be configured to map the original data space to the boundary of a strictly convex set in the data space. The features mentioned in this paragraph in combination with any one of the fifth example to seventh example provide an eighth example.

The transformation mapping may be configured to map the original data space to a sphere in the data space. The features mentioned in this paragraph in combination with any one of the first example to seventh example provide a ninth example.

The method may further include removing the second data points which do not lie between the determined hyperplanes from the training data. The features mentioned in this paragraph in combination with any one of the first example to ninth example provide a tenth example The method may include determining a sequence of pairs of hyperplanes separating the plurality of first data points from the plurality of second data points, the determining including, for each pair of hyperplanes, determining an orientation of the pair of hyperplanes based on a minimization of a distance between the pair of hyperplanes such that the plurality of first data points lie between the hyperplanes in relation to a distance between the pair of hyperplanes such that both the plurality of first data points and the plurality of second data points not yet separated from the plurality of first data points by a preceding pair of hyperplanes lie between the hyperplanes and determining the position of the pair of hyperplanes such that the plurality of first data points lie between the pair of hyperplanes and the plurality of second data points are at least partially separated from the plurality of first data points by the pair of hyperplanes. The features mentioned in this paragraph in combination with any one of the first example to tenth example provide an eleventh example.

Determining the orientation of the pair of hyperplanes may include selecting a candidate orientation and improving the orientation in course of one or more orientation search iterations. The features mentioned in this paragraph in combination with any one of the first example to eleventh example provide a twelfth example.

The candidate orientation may be selected to separate at least one second data point from the plurality of first data points. The features mentioned in this paragraph in combination with the twelfth example provide a thirteenth example.

Selecting the candidate orientation may include randomly selecting a second data point and determining the candidate orientation to separate at least the selected second data point from the plurality of first data points. The features mentioned in this paragraph in combination with any one of the twelfth example to thirteenth example provide a fourteenth example.

In each orientation search iteration the orientation may be improved by a weighted combination of the orientation with a different orientation. The features mentioned in this paragraph in combination with any one of the twelfth example to fourteenth example provide a fifteenth example.

The first data points may be positive examples and the second data points may be negative examples for a classification for which the polyhedral classifier is to be trained. The features mentioned in this paragraph in combination with any one of the first example to fifteenth example provide a sixteenth example.

Each data point may represent sensor data. The features mentioned in this paragraph in combination with any one of the first example to sixteenth example provide a seventeenth example.

According to one embodiment of the present invention, a classifier training device is configured to carry out the method of the first example to seventeenth example. The features mentioned in this paragraph provide an eighteenth example.

According to an embodiment of the present invention, a classification device includes a polyhedral classifier trained according to the method of the first example to seventeenth example. The features mentioned in this paragraph provide a nineteenth example.

According to an embodiment of the present invention, a vehicle includes at least one sensor providing input sensor data and a driving assistance system including a polyhedral classifier trained to classify the input sensor data according to any one of the first example to seventeenth example, wherein the driving assistance system is configured to control the vehicle based on the input sensor data classified by the polyhedral classifier. The features mentioned in this paragraph provide a twentieth example.

In accordance with an example embodiment of the present invention, a computer program may have program instructions that are configured to, when executed by one or more processors, to make the one or more processors perform the method according to one or more of the first example to eighteenth examples.

The computer program may be stored in a machine-readable storage medium.

In the figures, like reference characters generally refer to the same parts throughout the different views. The figures are not necessarily to illustrate a scale. Instead, emphasis is generally placed upon illustrating the principles of the present invention. In the description below, various aspects are described with reference to the figures.

DETAILED DESCRIPTION OF EXAMPLE EMBODIMENTS

The following detailed description refers to the figures drawings that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
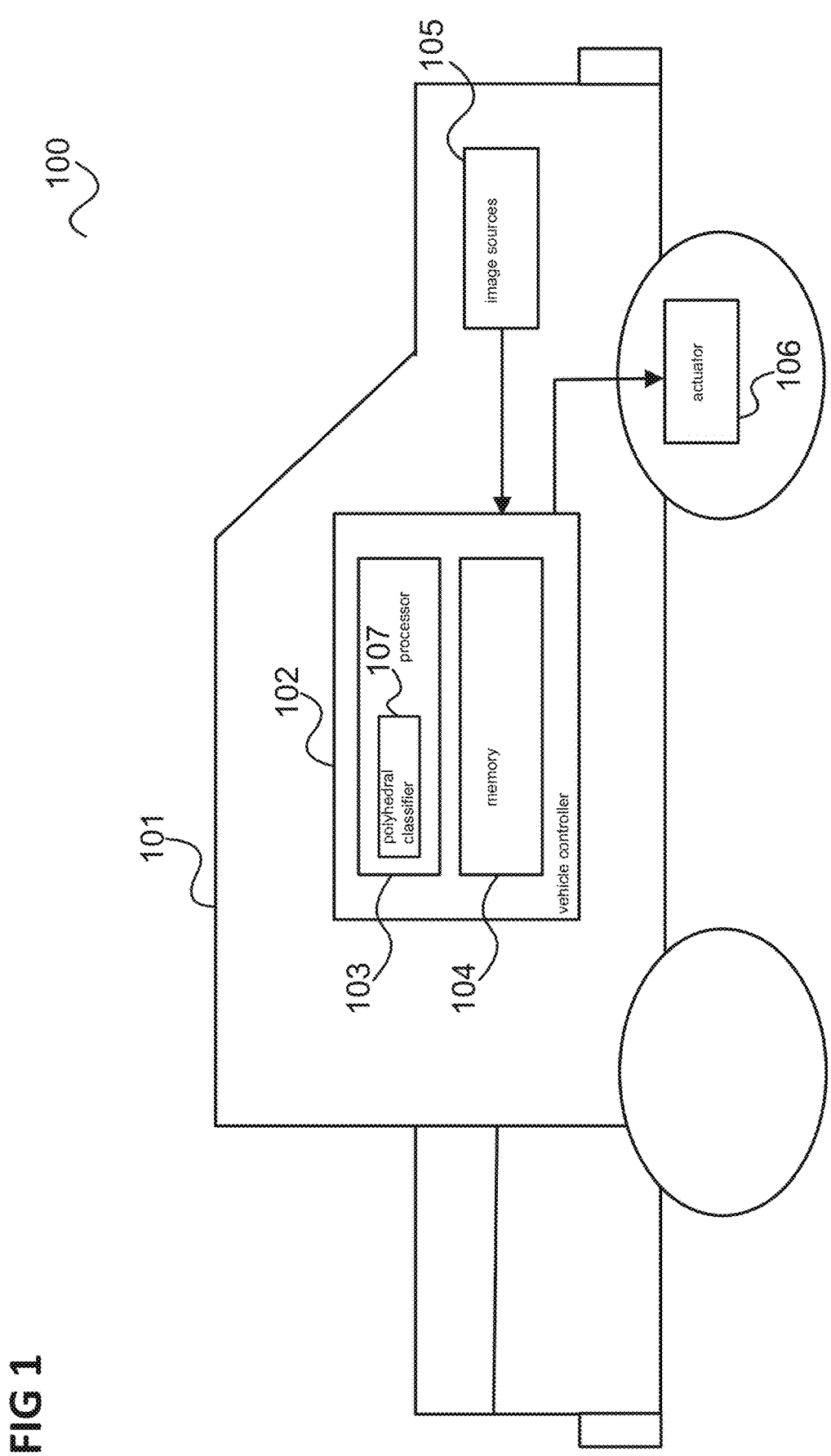
FIG. 1 shows an example of a classification task in an autonomous driving scenario.

FIG. 1 shows an example 100 for a classification task in an autonomous driving scenario.

In the example of FIG. 1, a vehicle 101, for example a car, van or motorcycle is provided with a vehicle controller 102.

The vehicle controller 102 includes data processing components, e.g., a processor (e.g., a CPU (central processing unit)) 103 and a memory 104 for storing control software according to which the vehicle controller 102 operates and data on which the processor 103 operates.

For example, the stored control software includes instructions that, when executed by the processor 103, make the processor implement a polyhedral classifier 107.

The data stored in memory 104 can include image data from one or more image sources 105, for example acquired by one or more cameras. An image can include a collection of data representing one or more objects or patterns. The one or more image sources 105 may for example output greyscale or colour pictures of the vehicle's environment. The one or more image sources 105 may be responsive to visible light or non-visible light such as e.g., infrared or ultraviolet light, ultrasonic or radar waves, or other electromagnetic or sonic signals.

The vehicle controller 102 may determine the presence of objects, e.g., fixed objects, such as traffic signs or road markings, and/or moving objects, such as pedestrians, animals and other vehicles, based on the image data.

The vehicle 101 may then be controlled by the vehicle controller 102 in accordance with the results of the object determination. For example, the vehicle controller 102 may control an actuator 106 to control the vehicle's speed, e.g., to actuate the brakes of the vehicle, for example when the polyhedral classifier 107 has classified an object on an image showing the environment to the front of the vehicle as pedestrian.

For this, the autonomous vehicle 101 needs to know what it sees on the road (pedestrian, car, truck, animals etc. vs. e.g., just a puddle on the street) and classify it correctly to determine the appropriate action.

For this, the polyhedral classifier 107 may be trained to a point where it can accurately classify objects and distinguish between objects (e.g., pedestrians vs. puddles).

The polyhedral classifier 107 classifies data (i.e., an image showing an object) by means of polyhedral separation. It should be noted that in the following explanations, it is assumed that data points, e.g., images, are classified, e.g., an image is classified as showing a pedestrian. However, e.g., in autonomous driving scenarios, an image (e.g., taken by camera 105) typically includes a plurality of objects. Therefore, in such an application, an image to be classified may for example be a partial image showing a single object of a large image. The partial image may for example be generated from the larger image by segmentation (e.g., by determination of bounding boxes) of the larger image into parts showing single objects (e.g., by a neural network trained accordingly).

Polyhedral separation is also known under the name of learning linear/neural decision lists and threshold functions.

Applications are numerous, ranging from visual object detection and classification (as in the autonomous driving scenario of FIG. 1) to text classification. For learning (i.e., training) a polyhedral classifier, variations of cutting plane procedures may be exploited, in which a hyperplane is found which separates a subset of negative training examples from all positive training examples; this procedure is performed iteratively until each of negative training examples is separated from the positive training examples by at least one of the hyperplanes constructed.

According to various embodiments, an affine-independent approach, referred to as SMM (Sequential Margin Maximizer) is proposed. It can be seen to lie within the cutting plane framework, but is based on solving (at least approximately), in each training iteration, an optimization problem which is tractable and whose optimal values are invariant under affine transformations, which leads to the guaranteed performance and the affine independence of SMM. The number of training iterations is bounded by a polynomial in parameters related to geometric properties of the training data and a given accuracy with which the boundary of the constructed polyhedron should approximate the boundary of a set separating positive examples and negative examples in the training data. This complexity result may be generalized to the case where convex separability of the training data is not assumed. In this general case, the binary polyhedral classifier found by the SMM according to an embodiment may be described by a system of constraints involving only linear, quadratic and square root terms.

According to various embodiments, a polyhedral classifier (e.g., polyhedral classifier 107 for autonomous driving) is trained to separate two sets of data points in an Euclidean space. These sets include a first set of data points having a first label (positive examples in the following) and a second set of data points having a second label (negative examples in the following) and form the training data which thus includes positive and negative examples. By means of a suitable data transformation, the separation of these data points may be reduced to convex polyhedral separation, where the goal is to find a convex polyhedron containing all positive examples and none of the negative ones.

Table 1 summarizes notations used in the following.

TABLE 1

| Name | Meaning |
|---|---|
| $X^+$ and $X^-$ | Positive and negative examples |
| $C$ | Set of linear functions |
| D | Subset of Euclidian space |
| T | Data transformation |
| $\Phi$ | Classifier |
| CH(x) | Convex hull of X |
| W(S, h) | Width of a compact set S in direction h |
| H(S) | Height of a compact set S |
| $\|x\|_N$ | max $\{|x_1|, \ldots, |x_n|\}$ |
| $n_S(x)$ | Projection of x on S |

TABLE 1-continued

| Name | Meaning |
|---|---|
| dist(., .) | Euclidean distance |
| $C_S(x)$ | Functions of C minimized by $x \in S$ over S |
| $\overline{C}_S(x)$ | Functions of C maximized by $x \in S$ over S |
| [S] | The closure of a set S |

Let D be a subset of a Euclidean space. It is assumed that $D^+ \dot{\in} D^- \dot{I} D$ where $D^+$ and $D^-$ are disjoint sets. A true decision boundary or simply a true boundary is a boundary of a subset of the respective Euclidean space separating $D^+$ from $D^-$ in the sense that no continuous path connects a point in $D^+$ with a point in $D^-$ without intersecting that boundary. It is clear that in general there are infinitely many true boundaries.

Let $S^+$ and $S^-$ be subsets of $D^+$ and $D^-$, respectively. $S^+$ and $S^-$ are the training set, i.e., the training data including data points in the Euclidean space. In general, $S^+$ and $S^-$ may not be separable by a convex set. However, the following statement holds:

If $X^+$ and $X^-$ are compact sets lying on the boundary of a strictly convex set, then there is a polyhedron P I in such that $P \cap X^+ = X^+$ and $P \cap X^- = \text{Æ}$, i.e., P separates $X^+$ from $X^-$.

In view of this statement, according to one embodiment, given (original) training data $S^+$ and $S^-$, i.e., an (original) training set including positive and negative examples, first a data transformation is performed to ensure that all of the points from the training set lie on a sphere.

Figure 2:
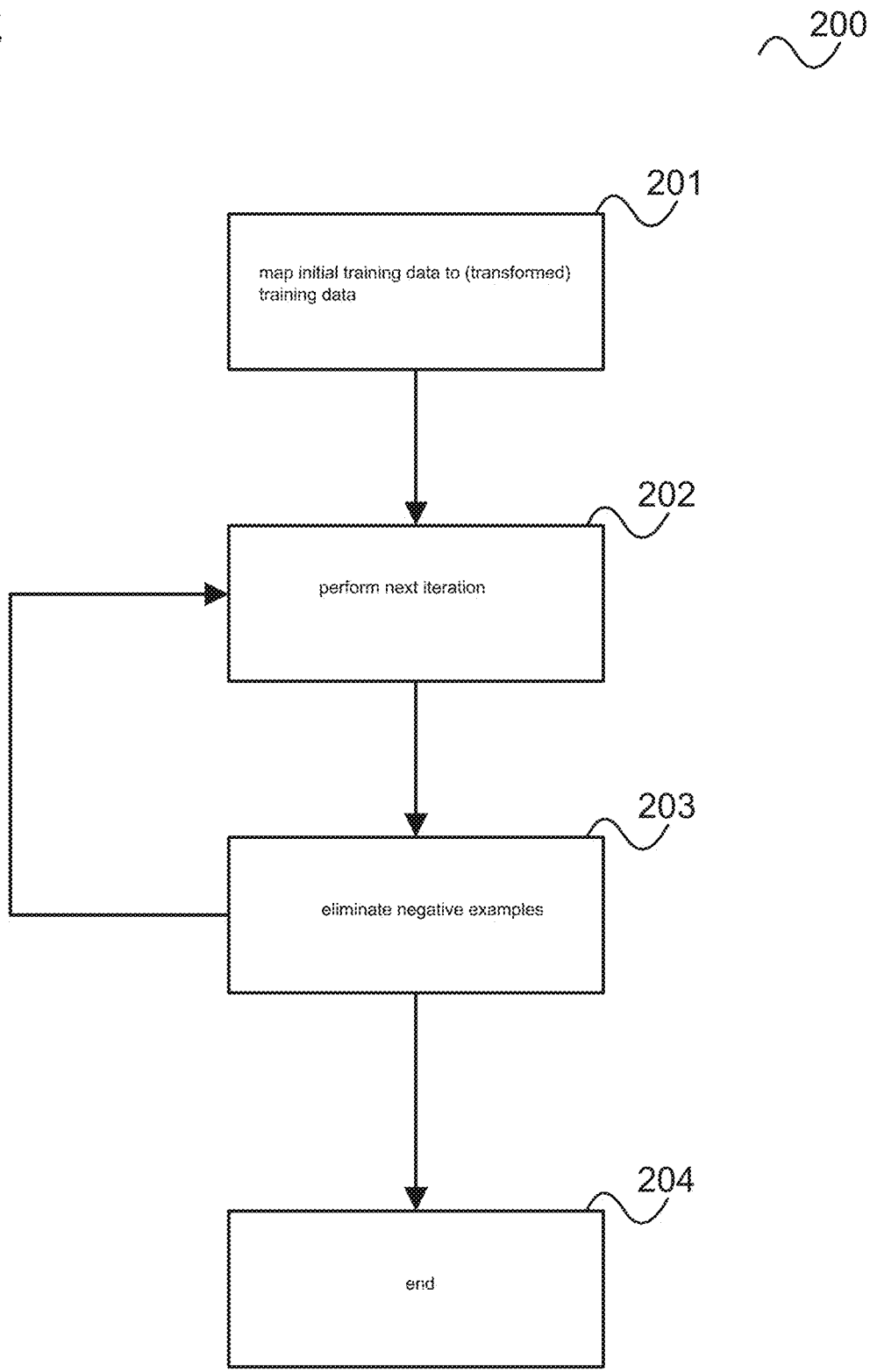
FIG. 2 shows a flow diagram illustrating a method for training a polyhedral classifier.

FIG. 2 shows a flow diagram 200 illustrating a method for training a polyhedral classifier.

In 201, as mentioned above, initial training data from an initial Euclidean space is mapped to (transformed) training data in a (transformed) Euclidean space.

The transformation is denoted as $\tau$ and the resulting subsets of the (original) training data set are denoted as $X^+ = \tau(S^+)$ and $X^- = \tau(S^-)$. $X^+$ and $X^-$ are simply referred to as the training data in the following (including a set of positive examples $X^+$ and a set of negative examples $X^-$). Based on the above statement $X^+$ and $X^-$ can be separated by a convex polyhedron assuming that $\tau$ is a mapping into the boundary of a strictly convex set. The transformation $\tau$ may be any suitable injective mapping.

For example, the transformation $$\tau(x) = \begin{pmatrix} \frac{1}{\sqrt{1 + \|x\|^2}} \cdot x \\ 1 + \frac{1}{\sqrt{1 + \|x\|^2}} \end{pmatrix} \quad (1)$$

may be used.

It is easy to verify that all $\tau(x)$ belong to a unit sphere centred at the unit vector $e_{n+1}$ whose first n components are equal to 0 and the last component is equal to 1.

Another possibility is to introduce a parameter $\gamma$ such that $$\tau(x) = ((1 + \|\gamma x\|^2)^{-1/2} \cdot \gamma x; 1 + (1 + \|\gamma x\|^2)^{-1/2})$$

The parameter $\gamma$ may be kept low (e.g., at 1 as in equation (1)) or may also take high values such as 106 to reduce the distortion caused by projections onto the sphere.

Figure 3:
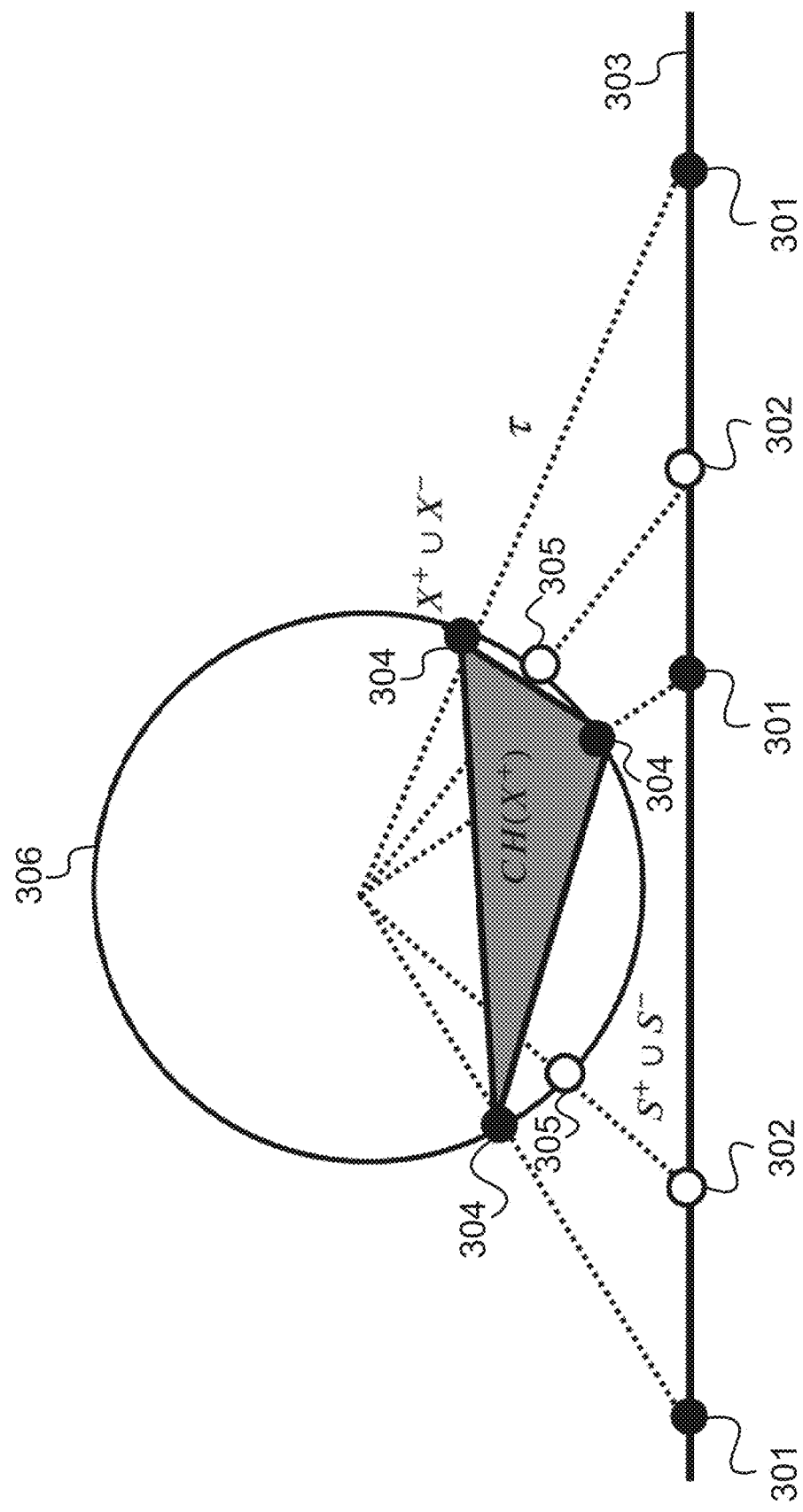
FIG. 3 illustrates a transformation of data points for the case that the original Euclidean space is one-dimensional.

FIG. 3 illustrates the transformation $\tau$ for the case that the original Euclidean space including the original training data $S^+$ and $S^-$ is one-dimensional.

The original training data set is indicated as dots 301 (positive examples) and circles 302 (negative examples) on an axis 303 representing the original Euclidean space.

The original training data is mapped to the (transformed) training data $X^+$ and $X^-$ represented by dots 304 (positive examples) and circles 305 (negative examples) on a sphere 306.

A triangle 307 is shown which illustrates a convex separator for the (transformed) training data $X^+$ and $X^-$.

A boundary separating $\tau(D^+)$ and $\tau(D^-)$ will be called a true boundary as well, unless unclear from the context.

Let $\mathcal{C}$ be a set of linear functions over the Euclidean space in containing $X^+$ and $X^-$: Consider the following system of linear inequalities given by a list of functions $f_k^{TM}$ $\mathcal{C}$ and intervals $I^k$ of i where k=1, ..., q:

$$f^k(x)^{TM} I^k, k=1, \ldots, q. \quad (2)$$

Let $\varphi(x)=1$ if x is feasible for the equation system (2) and $\varphi(x)=0$; otherwise. The mapping $\varphi$ is called a (convex) polyhedral classifier for $X^+$ and $X^-$ if and only if $\varphi(x)=1$ for all $x^{TM} X^+$ and $\varphi(x)=0$ for all $x^{TM} X^-$. This means that p is the indicator function of the polyhedron defined by the equation system (2).

According to an embodiment, in each iteration of a training process for a polyhedral classifier, one of the linear inequalities of the equation system (2) can be seen to be determined.

For this, in 302, the optimization problem $$\min \ F(z) = \frac{\max_{X_1} z - \min_{X_1} z}{\max_{X_1 \cup X_0} z - \min_{X_1 \cup X_0} z} \quad (3)$$

$$\text{s.t.} \quad z \in C \backslash \{0\}.$$

is at least approximatively solved.

At iteration k, the optimization problem (3) is solved where $X_1 = X^+$ is the set of positive examples and $X_0 = X_0^k$ is the current subset of negative examples. The solution found is a nonzero linear function z of class $\mathcal{C}$ which minimizes (at least approximately) the objective function F. Given a direction z, let $H_1$ and $H_2$ be parallel hyperplanes bounding the set of positive examples $X^+$.

Further, let $G_1$ and $G_2$ be supporting hyperplanes of the entire training set $X^+ E X^-$ which are parallel to $H_1$ and $H_2$.

Figure 4:
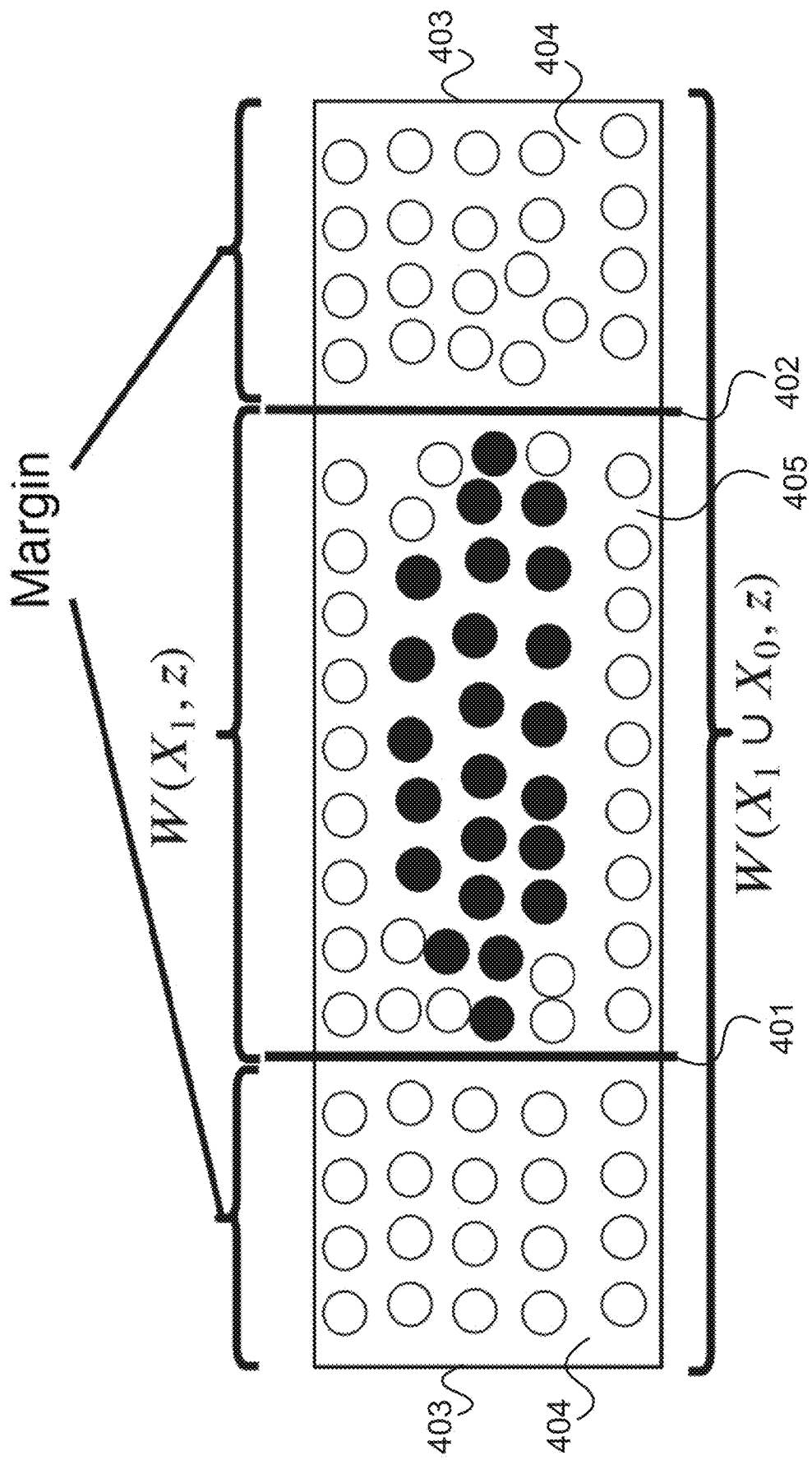
FIG. 4 shows a two-dimensional illustration of separating positive examples from negative examples of a training data set by means of a pair of hyperplanes.

A margin denotes the set of points lying between $G_1$ and $H_1$ or $H_2$ and $G_2$ as illustrated in FIG. 4.

FIG. 4 shows a two-dimensional illustration of separating positive examples (represented by dots) from negative examples (represented by circles) by means of a pair of hyperplanes 401, 402.

The pair of hyperplanes 401, 402 are the hyperplanes $H_1$ and $H_2$. The hyperplanes $G_1$ and $G_2$ correspond to the border of the "bounding box" of the whole training set.

Intuitively, in each iteration, a direction is determined such that the respective margin 404 containing only negative examples is maximized relatively to the width of the entire training set in that direction.

The solution of the optimization problem (3) is a nonzero linear function corresponding to a set $$\left\{ x: \min_{X^+} f \leq f(x) \leq \max_{X^+} f \right\}$$

A set of the above form is called a slab. In the kth iteration, the respective linear inequality $f_k(x)^{TM} I^k$ with $I^k$ [$\min_{X^+} f_k$; $\max_{X^+} f_k$] is added to the current system (2) which is successively built up for k=1, ..., q over the iterations of the training.

The objective function of (3) is not convex, but as can be shown, the optimization problem (3) is still solvable in polynomial time. Moreover, from the problem formulation it follows that it's optimal value is preserved under linear transformations and the image of the optimal set is the optimal set of the transformed problem.

For a reformulation of the optimization problem (3), a few geometric terms are explained in the following. The width of a compact set S in direction h is the distance between two parallel supporting hyperplanes of S whose normals are h. This directional width is denoted by W(S, h): The minimum width over all directions is simply called the width of S and denoted by W(S). The height of S is the maximum width of S over all directions, which is denoted by H(S). The convex hull of a set S is denoted by CH(S).

For the sake of convenience, linear functions are treated also as vectors of their components. For instance, if $z(x)=a^T x$, where a is a vector, then this is also written as z=a.

With the above definition of the width the function F of (3) can be written in terms of the widths of $X_1$ and $X_1 \dot{E} X_0$ in the respective direction:

$$F(z) = \frac{W(X_1, z)}{W(X_1 \cup X_0, z)} \quad (4)$$

Minimization function F is equivalent to maximization of 1−F(z) which can be interpreted as maximization of the area not covered by a supporting slab of $X_1$ relatively to a supporting slab of the entire training set. This area is the margin and the optimization problem (3) is also referred to as Margin Maximization Problem accordingly.

In other words, by determining a linear function z solving (at least approximately) the optimization problem (3) a pair of hyperplanes $H_1$ and $H_2$ is determined which define a slab 405 including the positive examples.

When the pair of hyperplanes, or equivalently, a linear function $f_k$, or further equivalently, a hyperplane direction (i.e., hyperplane normal vector) has been found in the kth iteration the negative examples which are not in the respective slab are eliminated from the set of unclassified negative examples in 203 and the next iteration is performed in 202 based on this updated training set (i.e., the training set of the kth iteration without the negative examples eliminated in the kth iteration, i.e., the negative examples not in the slab of the kth iteration).

In other words, after each iteration all negative examples located within the margin 404 are removed, and the optimization problem is (at least approximately) solved again with the updated training set.

When after eliminating the negative examples in 203 which are not in the current slab no negative examples are left in the training set the procedure ends (204).

The training procedure of FIG. 2 can be expressed as an algorithm as follows.

---

Algorithm 1: Sequential Margin Maximizer (SMM).

Input: $X^+$ $X^-$
Output: A polyhedral classifier $\varphi$ for $X^+$ and $X^-$
k := 1, $X_0^1$ := $X^-$;
while $X_0^k$ is nonempty do
    Search for a solution of the optimization problem
    w.r.t. $X_0 = X_0^k$ and $X_1 = X^+$; let $f_k$ be an (at least
    approximate) solution to the respective instance of
    optimization problem (3);

-continued

Algorithm 1: Sequential Margin Maximizer (SMM).

$I^k := [\min_{X_1^k} f_k; \max_{X_1^k} f_k];$
$X_0^{k+1} := X_0^k \cap \{x: f_k(x)^{TM} I^k\};$
$k := k + 1;$
end
return φ defined by $f_k$ and $I^k$; where $k = 1, ..., q$, wherein
q is the number of iterations of the while-loop.

At each iteration of the while-loop, the next training set $X_0^{k+1}$ is constructed by removing all the points from $X_0^k$ which are not in the slab $\{x: f_k(x)^{TM} I^k\}$ where $f_k$ is found by (at least approximately) solving (3).

An iteration of the training process corresponds to an iteration of the while-loop of algorithm 1.

For a variant of algorithm 1, as two points with different true labels cannot be at a zero distance from each other, it is assumed that for every training example, all points within some distance ρ>0 have the same label. Then, according to various embodiments, to ensure that the boundary of the slab found at iteration k is not closer than p for every positive example, the following modification of $I^k$ in the algorithm may be introduced:

$$I^k := \left[\min_{X_1^k} f_k - \frac{\rho}{\|f_k\|}, \max_{X_1^k} f_k + \frac{\rho}{\|f_k\|}\right]$$

Since a suitable ρ is not known in advance, the following step may be added to algorithm 1:

If $X_0^{k+1} = X_0^k$ then $\rho := \rho/2$.

That is, if no negative examples can be eliminated in the current iteration, ρ is divided by 2, which guarantees that the algorithm terminates and separates the positive examples from the negative ones. The starting value of ρ is for example 0.01 or 0.001.

It can be shown that each iteration of algorithm 1 runs in polynomial time.

Let $C_S(x)$ (resp. $\overline{C}_S(x)$) denote the set of functions of $\mathcal{C}$ minimized (resp. maximized) by $x^{TM}$ S over S: More formally, $C_S(x) = \{f \in \mathcal{C} : f(x) \leq f(y), \forall y \in S\}, \overline{C}_S(x) = \{f \in \mathcal{C} : f(x) \geq f(y), \forall y \in S\}$ If S is a finite subset of D and $\mathcal{C}$ is of finite dimension, e.g., a set of polynomials of a fixed degree, then $C_S(x)$ and $\overline{C}_S(x)$ are polyhedral cones.

It should be noted that F(z)=F(yz) for any nonzero y. Therefore, there is an optimal solution z such that $$\max_{X_1 \cup X_0} z - \min_{X_1 \cup X_0} z = 1 \quad (5)$$

Consider f in $\mathcal{C}$ and let $x_1^{TM} X_1$ and $x_0^{TM} X_0$ (resp. $\overline{x}_1^{TM} X_1$ and $\overline{x}_0^{TM} X_0$) be minimizers (resp. maximizers) of f on the respective sets. Then a function $z^{TM} \mathcal{C}$ which is not worse than f can be found by means of solving (6):

$$\min \quad z(\overline{x}_1) - z(x_1) \quad (6)$$
$$\text{s.t.} \quad z \in C_{X_i}(x_i) \cap \overline{C}_{X_i}(\overline{x}_i); \quad i = 1, 2$$
$$\max(z(\overline{x}_1), z(\overline{x}_0)) - \min(z(x_1), z(x_0)) = 1.$$

Here, the equation follows from (5). The margin maximization problem can be reduced to a number of optimization problems like optimization problem (6). Formally, the following statement can be shown:

Let $X_0$ and $X_1$ be finite sets. Then problem (3) reduces to $O(|X_1|^2 \cdot |X_0|^2)$ problems of the form (6).

This is because for every $f^{TM} \mathcal{C}$ a problem (6) can be written whose solution is not worse than f. The statement then follows by taking into account all possible choices of $x_1$ and $x_0$.

Based on this, it can be shown that the optimization problem (3) is solvable in polynomial time.

It should be noted that from the formulation of the optimization problem (3) it directly follows that a linear transformation does not change the optimal value and the image of the optimal set is the optimal set of the transformed problem.

An important aspect of polyhedral classifiers can be seen in their compactness, i.e., a classifier whose decision is based on a smaller number of hyperplanes is typically preferred. The number of inequalities defining a polyhedral classifier constructed by the training process described above is equal to the number of iterations performed. So the iteration complexity of the training process is in fact the complexity of the resulting classifier.

With each iteration, the current system of linear inequalities provides a more accurate separator for the training set than that considered at the previous step. So the question of complexity is how many iterations are needed to achieve a given accuracy.

An analysis of the training process yields a guaranteed complexity estimate for the number of iterations until the current system of inequalities defines an approximate binary classifier, i.e., one which approximates a boundary separating negative and positive examples with a given accuracy. More precisely, a binary function is an epsilon-approximate (binary) classifier for the sets of positive and negative examples if it can assign a false label to a point in the training set only if the distance between this point and a true boundary is not greater than epsilon.

Using methods of calculus and analytic geometry, it can be shown that, for any fixed dimension, the complexity of an epsilon-approximate binary classifier constructed by the training process described above is bounded by a polynomial in parameters related to geometric properties of the training data and 1/epsilon.

Moreover, the complexity results may be generalized to the case where convex separability is not assumed. In this case the approximate classifier is described by a system of constraints involving only linear, quadratic and square root terms. As well as in the convex case, the number of constraints found is bounded by a polynomial depending exclusively on the given accuracy and parameters related to geometric properties of the training data.

In practical application, although (3) can be solved in polynomial time, it may be computationally too expensive to search for an exact solution of the optimization problem (3). In view of this, in the above examples, it has been stated that the optimization problem is at least approximately solved. This, as well as a maximization of the margin, or, in other words, the determining of an orientation of a pair of hyperplanes based on a minimization of a distance between the pair of hyperplanes such that the plurality of first data points lie between the hyperplanes in relation to a distance between the pair of hyperplanes such that both the plurality of first data points and the plurality of second data points lie between the hyperplanes may be understood as determining a linear function z/determining a direction/determining a pair of hyperplanes based on the objective of maximizing the margin/minimizing the relative distance between the pair of hyperplanes. This may be understood as that in an iteration, a search for a linear function z/a direction/a pair of hyperplanes is performed wherein the search aims to maximize the margin/minimize the relative distance between the pair of hyperplanes and there is at least some improvement in course of the search (even if the global optimum is not reached). This means that a search for an optimal solution is performed but the global optimal solution will typically not be determined. At least, for example, a local optimum may be approximately determined in each iteration.

As an example for an embodiment based on such an approximate optimization, in the following, a randomized heuristic algorithm for searching a solution of the optimization problem (3) is described in the following.

Until the number of consecutive iterations without an improvement of the current value of F does not exceed a given limit (e.g., this limit is 1, i.e., there is no improvement in an iteration, or the limit is e.g., 3; it should be noted that these iterations are iterations of the search for a solution of the optimization problem (i.e., orientation search iterations) rather than the iterations of the while loop of algorithm 1):

1. Choose x at random from $X_0$ and let $f=x-e_{n+1}$. The x is a unique maximizer of f over $X^+ \dot{E} X^-$ which guarantees that at least one example will be removed from $X_0^k$ at the current iteration.
2. An optional step may be performed which needs solving linear programs (i.e., linear optimization problems): Determine $x_i$ and $\bar{x}_i$ such that $f^{TM} C_{X_i}(x)$ and $f^{TM} \bar{C}_{X_i}(x)$, i=1, 2 and find an (at least approximate) optimal solution z to (6).
3. Choose a direction r at random from a uniform distribution over [−1, 1]. Try to improve F(z) along r and −r: if an improving direction, move from z until the intersection with the boundary of one of the cones $C_{X_i}(x)$ and $C_{X_i}(x)$; i=1,2, $x \in X^+ \dot{E} X^-$ in that direction. Let z be the new point. Repeat this until no improvement is found or a given number of such local search iterations is exceeded (e.g., a limit of 5 such local orientation/direction search iterations).
4. Return $f_k:=z$.

It should be noted that the above heuristic works even if step 2 is skipped. If the limit on the number of iterations of its main loop is sufficiently large, then the heuristic finds an optimal solution with a high probability, provided that step 2 is included. If step 2 is skipped and the number of iterations at step 3 is sufficiently large, then, with a high probability, the heuristic finds a solution within a given approximation error.

To make the classification results more accurate, according to one embodiment, the following approach is taken to predict the label of an object (e.g., image or generally a sensor data element not belonging to the training data set) or multiple objects:

Find a polyhedron $P^+$ such that $P^+$ contains $X^+$ and does not contain any point of $X^-$ (using the training method described)

Find a polyhedron $P^-$ such that $P^-$ contains $X^-$ and does not contain any point of $X^+$ (i.e., learn a second polyhedron by means of the training method above with "reversed roles" of $X^+$ and $X^-$.

Define the classifier (for predicting the label of an object corresponding to a data point, mapped to the transformed space if necessary) in the following way:

Compute the sum $\rho^+$ of the distances from the data point to the halfspaces defining $P^+$ (e.g., to the "slabs" for all hyperplane pairs of the trained polyhedron)

In the same way, compute $\rho^-$ for $P^-$

If $\rho^+ < \rho^-$ then return 1 (label positive), else return 0 (label negative)

Training the polyhedral classifier may use n-fold cross-validation (e.g., 10-fold cross validation) for a training data set.

Experiments show that the above approach outperforms a conventional convex polytope machine (CPM) in terms of accuracy. Furthermore, the complexity of the description of the polyhedron can be kept much lower when including the optional step 2.

Figure 5:
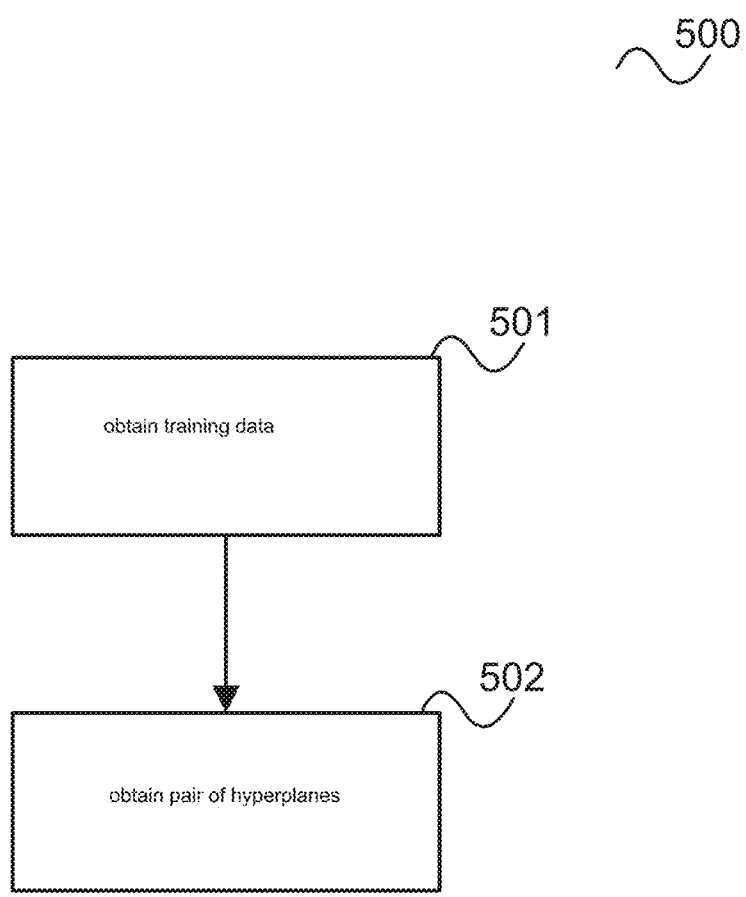
FIG. 5 shows a flow diagram illustrating a method for training a polyhedral classifier according to an embodiment.

In summary, according to various embodiments, a method is provided as illustrated in FIG. 5.

FIG. 5 shows a flow diagram 500 illustrating a method for training a polyhedral classifier according to an embodiment.

In 501 training data is obtained in a data space, the training data including a plurality of first data points associated with a first label and a plurality of second data points associated with a second label.

In 502 a pair of (at least substantially parallel) hyperplanes is obtained by determining an orientation of the pair of hyperplanes. The orientation is determined based on a minimization of a distance between the pair of hyperplanes such that the plurality of first data points lie between the hyperplanes in relation to a distance between the pair of hyperplanes such that both the plurality of first data points and the plurality of second data points lie between the hyperplanes. The position of the pair of hyperplanes is determined such that the plurality of first data points lie between the pair of hyperplanes and the plurality of second data points are at least partially separated from the plurality of first data points by the pair of hyperplanes.

According to various embodiments, in other words, pairs of hyperplanes are searched (e.g., in each iteration of a plurality of iterations) such that the relative distance between this pair of hyperplanes is as low as possible. The pair of hyperplanes is given by their orientation (e.g., in terms of a normal vector) and their position (which in particular defines their distance, e.g. along the normal vector).

The relative distance between the hyperplanes of this (first) pair of hyperplanes is the distance relative to the distance between the hyperplanes of a second pair of hyperplanes (which can be seen as the same hyperplanes, i.e., hyperplanes with the same orientation, but at a different location) having the same orientation as the (first) pair of hyperplanes but which are spaced such that all training data points (of the current iteration) lie between them. In other words, the first pair of hyperplanes encloses all data points having the first label and the second pair of hyperplanes encloses all data points (i.e., with both the first and the second label). In each of the pairs of hyperplanes, the hyperplanes are as close to each other as possible. The relative distance between the hyperplanes of the first pair is the ratio between the distance of the hyperplanes of the first pair to the distance of the hyperplanes of the second pair.

Determining an orientation of the hyperplanes to make this relative distance as low as possible (wherein the minimization is typically limited by the finite time available for the determination) can be seen to be equivalent to maximizing (as far as possible) the margin as described above or, illustratively, to maximize the "space gained" by the polyhedral separator (in terms of the space containing negative examples "cut off" by the current pair of hyperplanes) in the current iteration.

The approach of FIG. 5 can be used, as explained above, for training a classifier for classification of objects in an autonomous driving scenario. However, the approach may in general be used for training a polyhedral classifier for analysis of sensor information of any kind, e.g., a time series of sensor information, in particular in embedded systems.

The approach of FIG. 5 is especially fast and accurate when the input data set (including the training data) is a time series. In this case the complexity of approximate classifiers found by the training approach in accordance with the present invention is bounded by a polynomial in parameters which are only related to the given accuracy and geometric properties of the time series in question. The degree of the respective polynomial is constant independently of the dimension of the data.

The method of FIG. 5 may be performed by one or more processors. The term "processor" can be understood as any type of entity that allows the processing of data or signals. For example, the data or signals may be treated according to at least one (i.e., one or more than one) specific function performed by the processor. A processor may include an analogue circuit, a digital circuit, a composite signal circuit, a logic circuit, a microprocessor, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as processor or logic circuitry. It will be understood that one or more of the method steps described in detail herein may be executed (e.g., implemented) by a processor through one or more specific functions performed by the processor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for training a polyhedral classifier for classifying objects in an image, comprising the following steps:
    obtaining training data in a data space, the training data including a plurality of first data points associated with a first label and a plurality of second data points associated with a second label, the training data being based on the image, the first label represents a classification concerning whether an object is present in at least part of the image or not; and
    determining a pair of parallel hyperplanes by:
        determining an orientation of the pair of parallel hyperplanes based on a minimization of a distance between the pair of parallel hyperplanes that the pair of parallel hyperplanes need to have such that the plurality of first data points lie between the pair of parallel hyperplanes in relation to a distance between the pair of parallel hyperplanes that the pair of parallel hyperplanes need to have such that both the plurality of first data points and the plurality of second data points lie between the pair of parallel hyperplanes; and
        determining a position of the pair of parallel hyperplanes such that the plurality of first data points lie between the pair of parallel hyperplanes and the plurality of second data points are at least partially separated from the plurality of first data points by the pair of parallel hyperplanes, wherein:
    the polyhedral classifier belongs to a driving assistance system included in a vehicle and is trained to classify input sensor data provided by at least one sensor of the vehicle,
    the driving assistance system is configured to control the vehicle based on the input sensor data classified by the polyhedral classifier, and
    the pair of parallel hyperplanes are used for determining the classification and belong to the polyhedral classifier.

2. The method of claim 1, wherein the relation is a ratio of: the distance between the pair of parallel hyperplanes such that the plurality of first data points lie between the pair of parallel hyperplanes, and the distance between the pair of parallel hyperplanes such that both the plurality of first data points and the plurality of second data points lie between the pair of parallel hyperplanes.

3. The method of claim 1, wherein the determining of the pair of parallel hyperplanes includes determining a representation of a linear function mapping the data space to real numbers which gives the orientation of the pair of parallel hyperplanes and an interval whose endpoints give the position of the pair of parallel hyperplanes in the data space.

4. The method of claim 3, wherein the distance between the pair of the hyperplanes is given by a length of the interval.

5. The method of claim 1, wherein the obtaining of the training data in the data space includes mapping an original set of training data points in an original data space to the data space using a transformation mapping from the original data space to the data space, wherein the transformation mapping is configured to map the original data space to a boundary of a strictly convex set in the data space, and wherein the original data space and the data space are Euclidean spaces and a dimension of the data space is higher than a dimension of the original data space.

6. The method of claim 5, wherein the dimension of the data space is higher than the dimension of the original data space by one.

7. The method of claim 5, wherein the transformation mapping is configured to map the original data space to a sphere in the data space.

8. The method of claim 1, further comprising the following step:
    removing, those of the second data points which do not lie between the determined pair of parallel hyperplanes, from the training data.

9. The method of claim 1, further comprising the following step:
    determining a sequence of pairs of parallel hyperplanes separating the plurality of first data points from the plurality of second data points, the determining including, for each of the pairs of parallel hyperplanes of the sequence:
        determining an orientation of the pair of parallel hyperplanes of the sequence based on a minimization of a distance between the pair of parallel hyperplanes of the sequence that the pair of parallel hyperplanes of the sequence need to have such that the plurality of first data points lie between the pair of parallel hyperplanes of the sequence in relation to a distance between the pair of parallel hyperplanes of the sequence that the pair of parallel hyperplanes of the sequence need to have such that both the plurality of first data points and the plurality of second data points not yet separated from the plurality of first data points by a preceding pair of parallel hyperplanes of the sequence lie between the pair of parallel hyperplanes of the sequence; and determining a position of the pair of parallel hyperplanes of the sequence such that the plurality of first data points lie between the pair of parallel hyperplanes of the sequence and the plurality of second data points are at least partially separated from the plurality of first data points by the pair of parallel hyperplanes of the sequence.

10. The method of claim 1, wherein determining the orientation of the pair of parallel hyperplanes includes selecting a candidate orientation and improving the orientation in a course of one or more orientation search iterations.

11. The method of claim 10, wherein the candidate orientation is selected to separate at least one second data point from the plurality of first data points.

12. The method of claim 10, wherein selecting the candidate orientation includes randomly selecting a second data point from the plurality of second data points and determining the candidate orientation to separate at least the selected second data point from the plurality of first data points.

13. A classifier training device configured to train a polyhedral classifier for classifying objects in an image, the classifier training device configured to:

obtain training data in a data space, the training data including a plurality of first data points associated with a first label and a plurality of second data points associated with a second label, the training data being based on the image, the first label represents a classification concerning whether an object is present in at least part of the image or not; and determine a pair of parallel hyperplanes by:

determining an orientation of the pair of parallel hyperplanes based on a minimization of a distance between the pair of parallel hyperplanes that the pair of parallel hyperplanes need to have such that the plurality of first data points lie between the pair of parallel hyperplanes in relation to a distance between the pair of parallel hyperplanes that the pair of parallel hyperplanes need to have such that both the plurality of first data points and the plurality of second data points lie between the pair of parallel hyperplanes; and determining a position of the pair of parallel hyperplanes such that the plurality of first data points lie between the pair of parallel hyperplanes and the plurality of second data points are at least partially separated from the plurality of first data points by the pair of parallel hyperplanes, wherein:

the polyhedral classifier belongs to a driving assistance system included in a vehicle and is trained to classify input sensor data provided by at least one sensor of the vehicle, the driving assistance system is configured to control the vehicle based on the input sensor data classified by the polyhedral classifier, and the pair of parallel hyperplanes are used for determining the classification and belong to the polyhedral classifier.

14. A non-transitory machine-readable storage medium on which is stored program instructions for training a polyhedral classifier for classifying objects in an image, the program instructions, when executed by one or more processors, causing the one or more processor to perform:

obtaining training data in a data space, the training data including a plurality of first data points associated with a first label and a plurality of second data points associated with a second label, the training data being based on the image, the first label represents a classification concerning whether an object is present in at least part of the image or not; and determining a pair of parallel hyperplanes by:

determining an orientation of the pair of parallel hyperplanes based on a minimization of a distance between the pair of parallel hyperplanes that the pair of parallel hyperplanes need to have such that the plurality of first data points lie between the pair of parallel hyperplanes in relation to a distance between the pair of parallel hyperplanes that the pair of parallel hyperplanes need to have such that both the plurality of first data points and the plurality of second data points lie between the pair of parallel hyperplanes; and determining a position of the pair of parallel hyperplanes such that the plurality of first data points lie between the pair of parallel hyperplanes and the plurality of second data points are at least partially separated from the plurality of first data points by the pair of parallel hyperplanes, wherein:

the polyhedral classifier belongs to a driving assistance system included in a vehicle and is trained to classify input sensor data provided by at least one sensor of the vehicle, the driving assistance system is configured to control the vehicle based on the input sensor data classified by the polyhedral classifier, and the pair of parallel hyperplanes are used for determining the classification and belong to the polyhedral classifier.

* * * * *